(No Model.)

T. J. GIBBONS.
TWO WHEELED VEHICLE.

No. 303,428. Patented Aug. 12, 1884.

WITNESSES
Wm. M. Monroe.
John G. Hall.

INVENTOR
Thomas J. Gibbons
By Thos. P. Hall,
ATTORNEY

UNITED STATES PATENT OFFICE.

THOMAS J. GIBBONS, OF UNION CITY, INDIANA, ASSIGNOR OF ONE-HALF TO THOMAS JONES, OF SAME PLACE.

TWO-WHEELED VEHICLE.

SPECIFICATION forming part of Letters Patent No. 303,428, dated August 12, 1884.

Application filed February 2, 1884. (No model.)

*To all whom it may concern:*

Be it known that I, THOMAS J. GIBBONS, a citizen of the United States, residing at Union City, county of Randolph, and State of Indiana, have invented certain new and useful Improvements in Two-Wheeled Vehicles; and I hereby declare the following to be a description of the same and of the manner of constructing and using the invention, in such full, clear, concise, and exact terms as to enable any person skilled in the art to which it appertains to construct and use the same, reference being had to the accompanying drawings, forming a part of the specification, the principle of the invention being herein explained and the best mode in which I have contemplated applying that principle, so as to distinguish it from other inventions.

Figure 1:
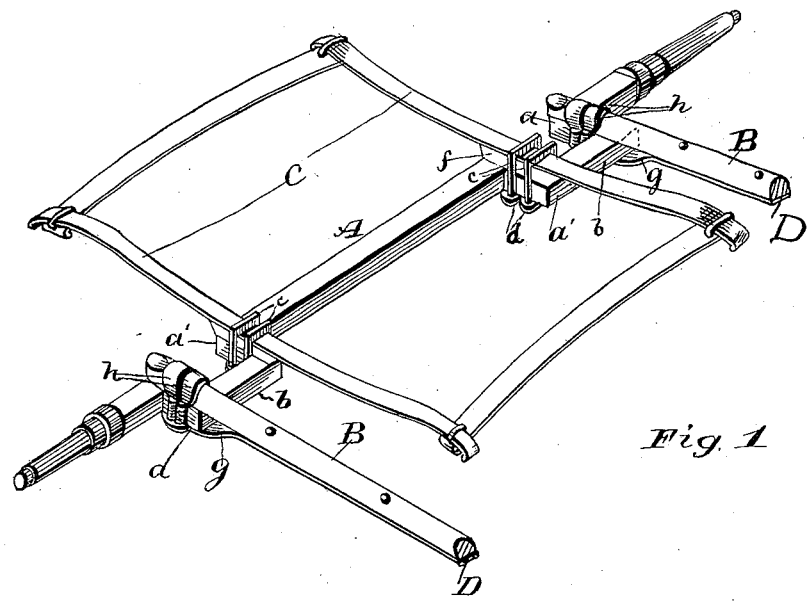
Figure 2:
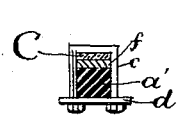
Figure 3:
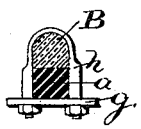

Referring to the drawings, Figure 1 is a perspective view representing the axle as provided with shafts and a platform-spring. Fig. 2 is a detail view in vertical cross-section of one of the spring-bearings. Fig. 3 is a detail view in vertical cross-section of one of the shaft-bearings.

The axle A is formed at each extremity with a double crank, the latter consisting of two forwardly-projecting arms, $a$ $a'$, and a cross-piece, $b$. The outer arm, $a$, provides bearing for the corresponding shaft, B, and the inner arm, $a'$, provides bearing for the corresponding side spring, C, of the platform-spring. Said side spring is secured to its bearing by two clips, $c$, a yoke, $d$, uniting the free ends of each said clip. The drawings represent an ordinary bearing-block, $f$, located between the spring and the axle.

Each shaft is provided with a shaft-iron, D, secured to its under side, the rear extremity of said iron being curved downwardly and broadened to form ears $g$, with which the free ends of the two clips $h$ engage. Said shaft-iron, clipped, as described, to the arm of the axle and extending along a portion of the shaft, as described, is adapted to act as a strong brace and to add strength to that portion of the shaft. The bearing-arms for spring and shaft may be of any desired length. The axle is formed integral throughout its entire length. The cranks can be directed either frontwise or rearwise from the longitudinal line of the spindles. Other forms of embodying and using the principle of my invention may be employed in substitution for the specific form herein shown. It will therefore be understood that omissions, substitutions, and changes may be made as regards the forms and parts herein set forth, provided the principles of construction embraced in the following claims are retained and employed. By means of my invention I obtain a single-bed axle, having bearings of suitable length for the springs and the shafts of a two-wheeled vehicle.

I therefore claim as my invention—

1. The combination, with an axle formed with a horizontal crank, of a spring seated on the latter, said crank providing extended longitudinal bearing for said spring, substantially as set forth.

2. The combination, with an axle having a double crank, of a spring having longitudinal bearing on one crank and a shaft having longitudinal bearing on the other crank, substantially as set forth.

In testimony that I claim the foregoing as my invention I have hereunto set my hand this 26th day of January, A. D. 1884.

THOMAS J. GIBBONS.

Witnesses:
L. D. LAMBERT,
N. CADWALLADER.